May 3, 1938.  G. MEERBECK  2,116,277
SEALING INSERTION
Filed Nov. 24, 1936
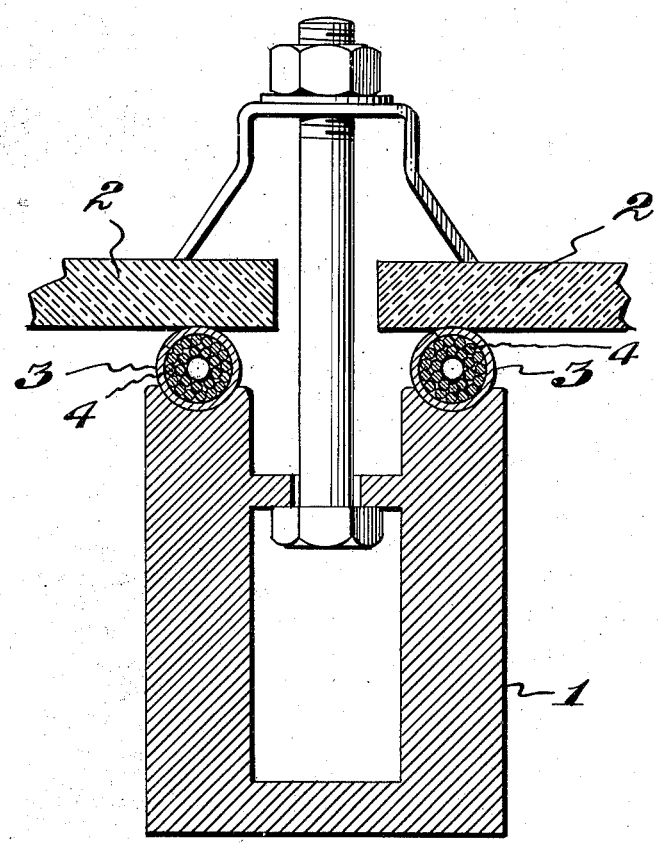
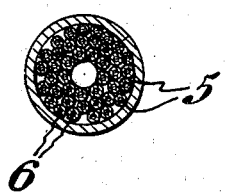
G. Meerbeck INVENTOR.
BY Glascock Downing & Seebold
ATTORNEYS.

Patented May 3, 1938

2,116,277

UNITED STATES PATENT OFFICE 2,116,277

SEALING INSERTION

Gottfried Meerbeck, Cologne-Mulheim, Germany, assignor to Felten & Guilleaume Carlswerk Actien-Gesellschaft, Cologne-Mulheim, Germany Application November 24, 1936, Serial No. 112,603
In Germany November 29, 1935

2 Claims. (Cl. 154—45.5)

According to the purpose of use, usually profiled strips of lead are employed as sealing insertion since lead does not allow moisture to pass through it and also because, owing to its yielding capabilities, it satisfactorily adapts itself to all irregularities and unevennesses of the place being sealed. For example in order to secure glass roofs in a water-tight manner on their framework without the aid of cement, sealing cords or tapes of tarred hemp with lead sheathing are inserted between the glass panes and the said rails or frames.

According to the present invention instead of using the sealing insertions heretofore usual insertions are employed consisting of polyvinyl chloride, after-chlorinated polyvinyl chloride or mixed polymerisates of vinyl chloride and acrylic acid ester.

The invention is clearly illustrated in the accompanying drawing, in which:—

Fig. 1 is a vertical section of a sealing insertion embodying the invention, and Fig. 2 is a cross sectional detail of a slightly modified form of tube.

In Fig. 1 of the drawing 1 represents the supporting rail or frame of the glass roof on to which the glass plates 2 are firmly bolted. Between the said supporting rail or frame and the glass plates thick walled tubes 3 of polyvinyl chloride which are pressed around tarred hemp cords 4 are inserted as sealing cords.

In many cases it is advisable to use in place of the tarred hemp cords paper cords or paper strings 5 in which are embedded readily flexible metal wires 6, (Fig. 2) for the purpose of imparting to the sealing cords that property peculiar to lead strips of adaptation to every shape without spring action.

What I claim is:—

1. A sealing insertion, e. g. in the form of cord or tape, consisting of an outer sheath comprising a substance selected from the group consisting of: polyvinyl chloride, after chlorinated polyvinyl chloride, and mixed polymerisates of vinyl chloride and acrylic acid ester, and a core of tarred hemp.

2. A sealing insertion, e. g. in the form of cord or tape, consisting of an outer sheath comprising a substance selected from the group consisting of: polyvinyl chloride, after-chlorinated polyvinyl chloride, and mixed polymerisates of vinyl chloride and acrylic acid ester, and a core of paper string containing at least one inlaid flexible metal wire.

GOTTFRIED MEERBECK.